June 15, 1965 C. E. RICKARD 3,188,733
TORQUE JOINT
Filed July 28, 1961 3 Sheets-Sheet 1

INVENTOR.
Clyde E. Rickard
BY Green, McCallister, & Miller
HIS ATTORNEYS

June 15, 1965  C. E. RICKARD  3,188,733
TORQUE JOINT

Filed July 28, 1961  3 Sheets-Sheet 2

INVENTOR.
Clyde E. Rickard
BY Green, McCallister & Miller
HIS ATTORNEYS

June 15, 1965 C. E. RICKARD 3,188,733
TORQUE JOINT

Filed July 28, 1961 3 Sheets-Sheet 3

INVENTOR.
Clyde E. Rickard
BY Green, McCallister & Miller
HIS ATTORNEYS

United States Patent Office 3,188,733
Patented June 15, 1965

3,188,733
TORQUE JOINT
Clyde E. Rickard, Pittsburgh, Pa., assignor to McDowell Manufacturing Company, Milivale, Pa., a corporation of Pennsylvania
Filed July 28, 1961, Ser. No. 127,700
1 Claim. (Cl. 29—523)

This invention relates to the joining of hollow or pipe members and particularly, to producing an improved joint between one pipe or tubing member and a telescopically assembled second pipe or tubing member that is in the nature of a mechanical, torque-load-resisting joint.

A phase of the invention deals with mechanically joining a circumscribing hollow or tubular supporting or housing body member of a relatively thicker wall construction or of a harder metal material, such as steel, with a supported hollow, tubing or pipe member of a thinner wall construction or of a relatively softer metal material, such as aluminum, and wherein the hollow supported member is positioned in a complementary interfitting or telescopic relation with respect to the hollow support member. It also relates to providing or rolling-in complementary, secure-locking configurations in the peripheral wall of the tubing or pipe member that have been first imparted to an opposed peripheral wall surface of the housing body member.

The invention is developed based on the need for a high torque or twist-resistant mechanical joint between a pair of members that are employed as irrigation members, so that they may be effectively used for a pipe line that is rolled or wheeled from one irrigating position to another. A rolling pipe line is usually made up of a series of pipe or tubing members coupled or joined together in a longitudinal line and carried between joints by longitudinally spaced-apart wheel frames whose wheels are adapted to move the pipe line transversely from one irrigating location to another. The Beyer Patent No. 2,642,311 shows an exemplary form of wheel frame, but that is mounted to move a pipe line longitudinally. It, however, has application to other fields of utilization, such as in providing thread protectors.

An object of my invention has thus been to devise a solution to the problem of providing a highly torque-resistant mechanical joint for tubular or hollow members;

Another object has been to develop an improved joint between a pair of interfitting tubular or hollow members which is highly torque-resistant and can be inexpensively and effectively produced;

Another object of my invention has been to provide an improved semi-permanent joint between interfitting hollow members that can, in simple and effective operations, be mechanically accomplished, and that will be highly resistant to torque action as well as to longitudinal-axial and other separating force action;

Another object of my invention has been to impart configurations or serrations to the peripheral surface of a relatively stronger hollow or tubular body member and then, after a relatively weaker or more ductile hollow or tubular member has been placed in abutment with such surface, impart the configurations or serrations to the co-operating peripheral surface of the latter member and thereby securely lock the members together;

A further object of my invention has been to provide a highly torque-resistant, expansion-peened or rolled-in complementary locking joint between a pair of telescopically interfitting hollow metal members;

A still further object of my invention has been to provide a new and improved procedure for mechanically joining together a pair of hollow or tubular members;

These and other objects of my invention will appear to those skilled in the art from the illustrated embodiments, the description thereof and the claim.

In the drawings, FIGURE 1 is a somewhat fragmental side view in elevation and partial section illustrating a step in producing, as by rolling-in, a group of peripheral wall securing banding portions along an inner peripheral wall surface of a hollow support member, such as a coupling housing body, wherein a smooth, annular grooved or recessed spacing banding wall portion is centrally formed and a pair of the adjacent and spaced-apart, transverse, serrated, side peripheral wall banding portions are simultaneously produced on the same peripheral surface; in this view, the serrations are transverse or are produced to extend axially-longitudinally of the member;

Figure 1:
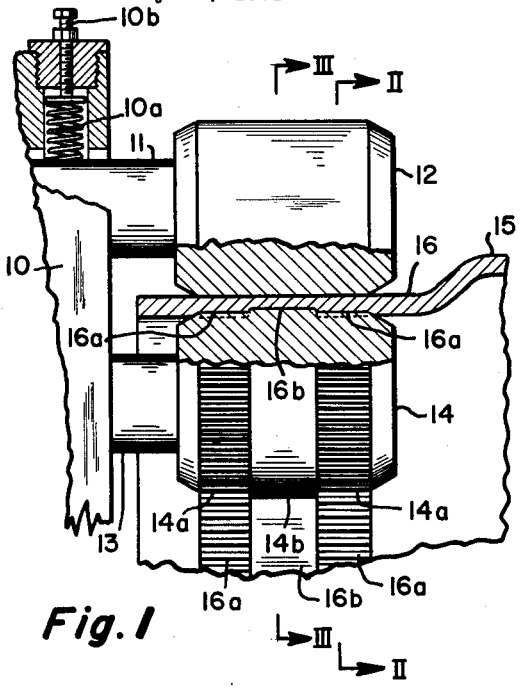
Figure 2:
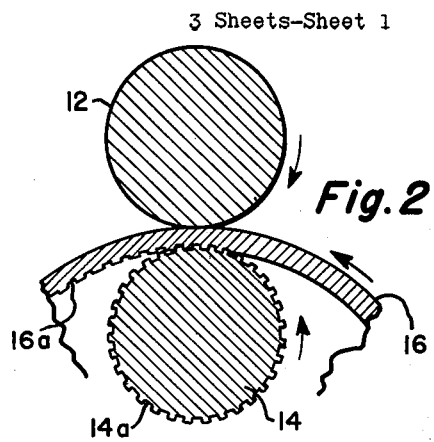
FIGURE 2 is a somewhat fragmental end section in elevation on the same scale as and taken along the line II—II of FIGURE 1.
Figure 3:
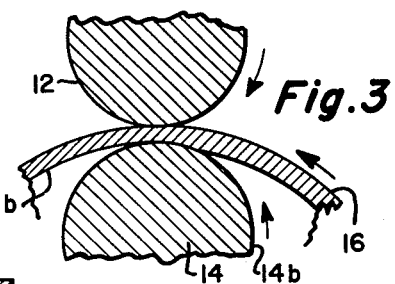
FIGURE 3 is a somewhat fragmental end section in elevation taken along the line III—III of FIGURE 1.
Figure 5:
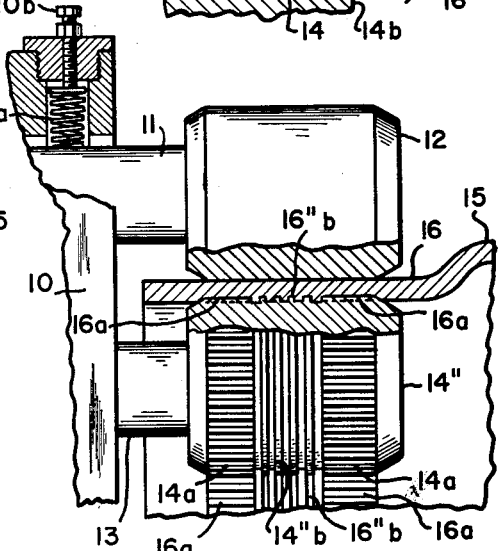

FIGURE 5 is a side view in elevation and partial section on the scale of FIGURE 1 and illustrating an operation of simultaneously forming a spacing or central peripheral serrated wall banding portion in which the serrations extend annularly or peripherally about or along the wall surface of a hollow support member, and of forming adjacent transverse, serrated, side peripheral wall banding portions whose relatively short length serrations extend longitudinally-axially of the member;

FIGURES 1 to 5, inclusive, are illustrative of what may be termed preliminary steps in providing my improved mechanical joint and as applied to a hollow supporting relatively thicker wall member, such as a coupling housing body member, that is to be joined with a relatively thinner wall hollow supported member, such as a conduit, tubing or pipe member. The employment of my invention in connection with thread protecting will involve conventionally cutting threads along the wall periphery of the open end portion of a pipe member, such as female threads in its inner periphery.

Figure 4:
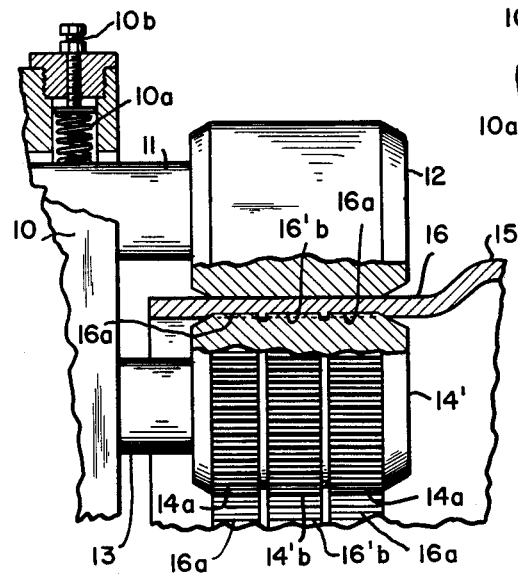
FIGURE 4 is a side view in elevation and partial section on the same scale as FIGURE 1 and illustrating the simultaneous forming of a group of three transverse peripheral serrated wall banding portions in which the serrations or teeth extend longitudinally-axially of the tubular member.
Figure 6:
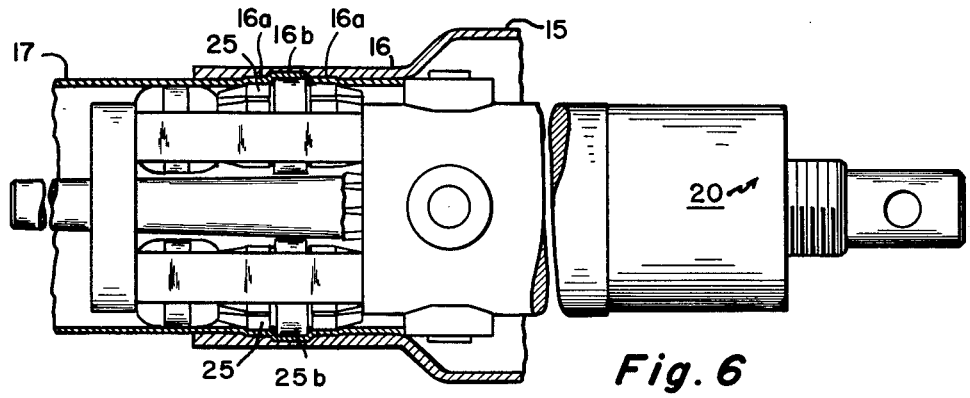
Figure 7:
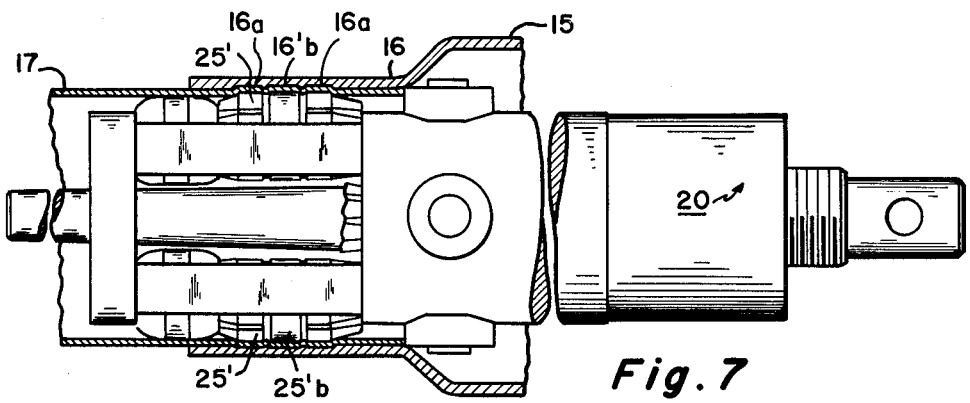
Figure 8:
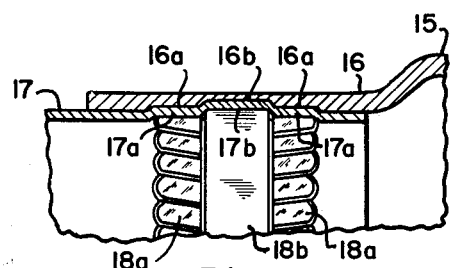
Figure 9:
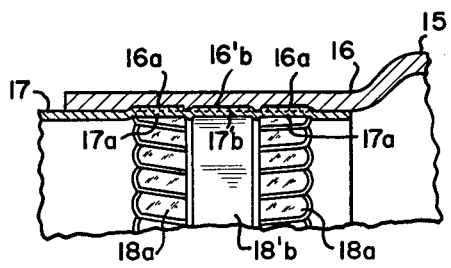
Figure 10:
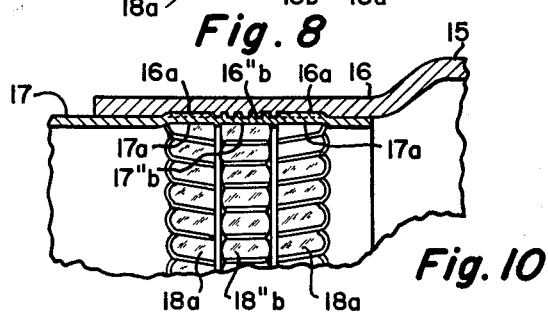
Figure 11:
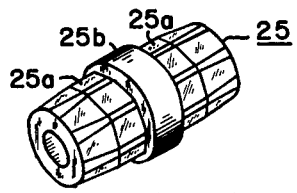
Figure 12:
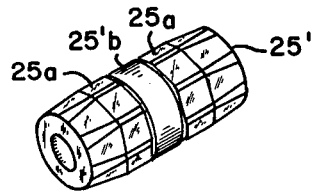
Figure 13:
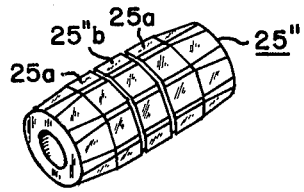
Figure 14:
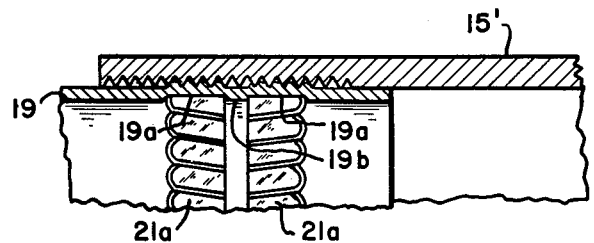
Figure 15:
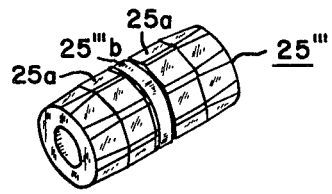

FIGURE 6 is a side view in elevation and partial section illustrating the forming of a complementary offset spacing or central peripheral wall band and adjacent serrated, peripheral side wall bands along an abutting interfitting or telescoping, opposed, engaging peripheral surface of a hollow supported member that is to be mechanically joined with the support member, such as a coupling housing body; in this view, a roller expanding and peening tool is employed to produce the joint;

FIGURE 7 is a view similar to FIGURE 6 employing the same general type of tool of FIGURE 6, but using rollers having a smaller diameter of central area to produce a joint employing peripheral wall banding portions in a hollow support member such as produced by the steps illustrated in FIGURES 4 and 5, and which does not involve the forming of a recessed smooth wall banding portion in the outer or supporting hollow member;

FIGURES 8 to 10, inclusive, are slightly enlarged fragmental side sectional views in elevation through members joined together by procedure employing a supporting or outer member, as produced in accordance with FIGURES 1, 4 and 5;

FIGURE 8 shows a joint as produced by a tool employing the rollers of FIGURES 6 and 11;

FIGURE 9 shows a joint as produced by a tool employing the rollers of FIGURES 7 and 12;

FIGURE 10 shows a joint as produced by a tool employing the rollers of FIGURE 13;

FIGURE 11 is a side perspective view showing the type of roller used for central, full wall thickness expanding and for side-expanding-peening operations, such as illustrated by the operation of FIGURE 6 and the resultant joint of FIGURE 8;

FIGURE 12 is a side perspective view of a modified roller use for limited central expanding and for side-expanding-peening operations, such as illustrated by the operation of FIGURE 7 and the resultant joint of FIGURE 9;

FIGURE 13 is a side perspective view of a modified roller, such as employed in producing the joint of FIGURE 10, wherein central and side expanding-peening operations are effected;

FIGURE 14 is a fragmental side sectional view in elevation illustrating the mounting of a tube protector sleeve on serrated portions comprising female threads of an end portion of a pipe member, also employing principles of my invention;

And, FIGURE 15 is a perspective view of a modified roller such as employed for producing the joint of FIGURE 14.

My invention is base upon the discovery that configurations, serrations, knurls, teeth, etc. preliminarily produced on a peripheral wall surface of a relatively strong tubing or hollow support member or one having a greater resistance to deformation can be faithfully reproduced in a complementary manner on an opposed cooperating interfitting peripheral wall surface of a second tubing or hollow supported member that is less resistant to deformation or more ductile and can be accomplished in such a way as to provide a highly torque-resistant and improved mechanical joint between such members.

In carrying out my invention, I first form the desired configurations on a peripheral wall area of the member which is to constitute the supporting, heavier-wall or stronger pipe or tubing member, such as a coupling housing body. Then, a second tubing member which is to be joined therewith and which may be of relatively thinner wall thickness or of more ductile material is inserted or slid-in longitudinally-endwise in a telescopic relation with respect to the first member, such that its open end portion is in abutting alignment with the configurations on the first member.

In the final step, a rolling, peening-expanding operation is effected upon the free or exposed (inner) peripheral wall of the second or supported member by a radial-expanding and rolling, hammering-out operation to move cooperating peripheral wall bands of the second member into the opposed configurated peripheral wall portions of the first or support member. In this manner, I produce corresponding configurations on the opposed peripheral surface of the second member that are faithfully reproduced thereon and that provide a highly improved and secured torque-resistant joint between the two members.

Employing this principle in connection with a thread protecting sleeve (see FIGURE 14) is securely held in position during the shipment and handling of the threaded pipe member by spaced, expanded-on, complementary, peripheral wall bands so as to prevent damage to the threaded open end portion of the pipe member. The sleeve can then be readily removed by making a longitudinal cut along its extent and then collapsing it out of its abutting-joined relationship with the threaded end of the pipe member.

I have found that a pair of complementary, expanded-out, locking peripheral wall bands are highly desirable in providing a secure and fool-proof mechanical joint between a pair of tubing members, and that such complementary bands should comprise at least two and preferably three groups in a coupling joint, such as used for carrying liquids, gases, sludges, and other fluids under relatively high pressures, such as in the neighborhood of up to 600 p.s.i. A suitable tool for simultaneuosly effecting rolling-expanding peening operations is illustrated in the Hempel Patent No. 2,898,971. As shown in FIGURES 11, 12 and 15, the rollers of such a tool may be modified, depending upon the desired type of rolling-out action that is to be accomplished. For example, the roller of FIGURE 11 has a central smooth band of enlarged diameter that effects an outward-offsetting of a full wall thickness band of the supported wall member into a recessed portion of the supporting member, see FIGURE 8.

My invention is particularly applicable to joining hollow members where a supporting or outer member serves as a reinforcing or main supporting member at the joint and a supported or inner member is to be mechanically secured thereto and therewithin to resist various types of separating forces and especially, torque and longitudinal pull-out separating force action between the members. Locking serrations or knurls on each member are shown in the form of small, alternate, teeth and notch or groove portions wherein the teeth portions are wider than the notch portions to maximize the strength of the joint formed with the cooperating members. By way of example, I have applied a torque of about 31,500 pounds to a joint (such as shown in FIGURE 8) between a supporting housing body member and a four inch diameter pipe (supported) member and found that there was no failure at the joint, but only in the pipe, itself. I have been able to at least double torque resistance, as compared to a joint such as shown produced by the Hempel Patent No. 2,898,971, for example, from about 17,000 pounds to about 40,000 pounds.

In FIGURE 1, I have shown a roll stand 10 which carries a pin shaft 11 for rotatably carrying a smooth-surface, outer or backing-up roll or roller 12. The stand 10 also carries a shaft 13 on which a configurating or serrating or knurling roll or roller 14 is mounted. The roll 14 may be secured to the shaft 13 and the shaft 13 may be driven by an electric motor in a conventional manner to rotate an open-end mounting portion 16 of a hollow body or tubing member 15 peripherally along the pass defined by the rolls 12 and 14. The depth of the serrations is controlled by the amount of force exerted by a tension spring 10a on the pin shaft 11 and, as adjusted by a turn-down screw 10b. As noted, the backing-up roll 12 is urged towards the roll 14 to close the pass therebetween. As an alternate, both the rolls 12 and 14 may be rotatably mounted on their respective shafts 11 and 13, and the hollow member 15 directly actuated to rotate therebetween.

As shown in FIGURE 1, the driven serrating roll 14 has a pair of side or outer, adjacently spaced-apart, relatively short-width, cross-extending, peripheral, annular, serrated areas or bands 14a, and a spacing, intermediate or central slightly radially-outwardly-offset, smooth, peripheral, annular banding area 14b of larger diameter. This construction produces side, peripheral, serrated banding wall portions 16a along the inner peripheral wall of the end portion 16 (see also FIGURE 2), and an intermediate or spacing, open recessed or grooved peripheral banding wall portion 16b therebetween, see also FIGURE 3.

FIGURE 4 illustrates a similar type of rolling-expanding apparatus or device that uses a modified type of serrating roll 14′ which has side serrated banding areas 14a and a spacing or central serrated banding area 14′b of the same outer diameter to produce corresponding, annular or peripheral serrated banding wall portions 16a and 16′b on or within the inner peripheral wall of the mounting end portion 16 of the hollow member 15. In FIGURE 5, the same apparatus or device is employed as in FIGURES 1 and 4, but the roll 14″ is provided with a central portion 14″b having peripherally-extending, circular or annular serrations which produce a correspondingly configurated peripheral wall band 16″b on the mounting end portion 16 of the hollow member 15.

Referring particularly to FIGURES 6 and 7, a roller expanding and peening tool or device 20 is inserted within the open end portion of a hollow supported or tubing member 17 and the tool is then rotated to effect a hammering-peening type of expanding-rolling action along the inner periphery of the member 17 in alignment with contoured bands of the inner peripheral wall of the open end mounting portion 16 of the hollow member 15. FIGURES 8 to 10 illustrate that the inner wall of the hollow supported member 17 has peening or hammer marks 18a produced thereon in alignment with side bands 17a by the operation of rollers of the tool 20.

Employing rollers 25, as shown in the tool of FIGURE 6, I form (see FIGURE 8) a spaced-apart side pair of peripheral wall bands 17a in the hollow member 17 whose abutting (outer) peripheral wall surfaces have configurations or serrations that are complementary with and are securely locked in an interfitting relation with opposed configurated or serrated wall surface banding portions 16a of the support member 15. In addition, the supported hollow member 17 has a spacing, intermediate or central peripheral wall band 17b that is smooth on its exposed peripheral surface 18b, as well as on its outer or abutting wall surface, and is expansion-displaced as to its full wall thickness outwardly or radially within the recessed or grooved peripheral banding wall portion 16b of the hollow support member 15.

In the joint of FIGURE 9, as produced by a tool 20 using modified rollers 25' of FIGURE 12 (as shown in FIGURE 7), I form similar serrated peripheral wall bands 17a, exposed peened areas 18a, and a spacing central or intermediate wall band 17'b which also has a smooth exposed peripheral surface 18'b that is in a closely abutting expanded-out relation with an opposed peripheral spacing banding portion 16b of the hollow member 15. It will be noted that in this joint construction, the band 17'b has the same outward expansion as the bands 17a and, like the band 17b of the construction of FIGURE 8, is discontinuous with its associated side bands of the hollow supported member 17.

Although the rollers 25' may be employed for expanding-out a spacing or central wall band by using a hollow member 15 having either the banding portions 16'b or 16"b, for the purpose of illustration, I have shown the employment of the banding portion 16'b to provide a correspondingly configurated wall band 17b in the member 17 of FIGURE 9. In the joint of this figure, the spacing, central or intermediate peripheral banding wall portion 16'b has the same diameter as the portions 16a, has longitudinal-axial or transverse serrations, and is in an abutting, complementary relation with the corresponding outer serrated surface of the wall band 17'b. The exposed inner peripheral surface 18'b of the wall band 17'b is smooth.

In producing the joint of FIGURE 10, I employ rollers 25" of FIGURE 13 in the tool 20 of FIGURES 6 and 7. A circumscribing or hollow support member 15 having either the configurations of FIGURES 4 or 5 may be employed, although for illustration, it will be noted that I show the use of a support member 15 whose end portion 16 is configurated, as shown in FIGURE 5, to provide side serrated banding portions 16a and a spacing or central serrated wall banding portion 16"b whose serrations extend annularly or peripherally of the member. The supported member 17 has corresponding, latch-interfitting peripheral side wall bands 17a and a spacing or central wall band 17"b. Peened surfaces 18a and 18"b are produced on the exposed or inner sides of such wall bands.

In FIGURE 14, I have shown a pipe member 15' which has external or female threads and which is provided with side peened-out expanded wall bands 19a and a slightly expanded spacing wall band 19b. It will be noted that the outer wall surfaces of the bands 19a are in a fully complementary serrated or threaded interfitting, expanded-out relation with opposed threading banding portions of the pipe member 19, and that the smooth-surfaced, intermediate banding portion 19b is merely expanded into the ridges or edges of the opposing threads. The central band 19b, like the bands 17b, 17'b and 17"b, is discontinuous with respect to the side bands 19a that on their exposed or inner wall surfaces show slight hammer or peening marks 21a. FIGURE 15 shows the type of roller 25''' which is used in the tool 20 for producing the joint of FIGURE 14.

In FIGURE 11, I have shown a roller 25 which is of a type corresponding to the roller of the Hempel patent No. 2,898,971 and has peening faces or bands 25a and a smooth center face or band 25b of larger diameter. In FIGURE 12, I have shown a modified roller 25' which has the same type of faces or bands 25a as the roller 25 of FIGURE 11, but has a central banding face or band 25'b whose diameter corresponds to the maximum diameter of the portions 25a from the peening ridges or edges thereof. In FIGURE 13, the roller 25" has a modified central face or band 25"b which, like its side faces or bands 25a, is provided with peening edges. In FIGURE 15, the roller 25''' has a narrower, smooth central face or band 25'''b whose outer diameter corresponds to the maximum outer dameter of the side face portions or bands 25a in the spacing between the peening ridges or edges thereof.

It will be noted from FIGURES 1, 4 and 5 that the outer peripheral surface of the portion 16 of the hollow outer member 15 remains the same and is not deformed or recessed by the back-up roll 12, but that the inner peripheral surface is deformed or configurated radially-outwardly. If the hollow outer member 15 is of relatively slight wall thickness of about .125 of an inch or less, I have found that it is advisable to provide it with an outer support, such as a split-ring or split vise, when the inner hollow member 17 is being rolled-expanded into a joined, complementary banding wall relation therewith, as by a tool, such as shown in FIGURES 6 and 7. Although it appears that a pinch roll pass may be employed for the final or joining operation as to the hollow members 15 and 17, I have found that a rolling or deforming-in from the outside of an outwardly-superimposed member 17 to wall-band-conform its wall to configurations on the outer surface of an inner hollow member 15 is not practical, since there is a tendency for the wall diameter of the member 17 to grow longitudinally, and since expansion-forming of the joint is important in providing complementary, displaced, configurated, strong wall bands in the member 17. The use of a tool, such as shown in FIGURE 6, makes it practical to form a semi-permanent mechanical joint in the field by making available members 15 that have been previously suitably configured. As will be apparent, any suitable configurations may be provided in accordance with my procedure, although the exemplary forms have been found to produce best results from the standpoint of a joint for pipe members.

The member 15 will ordinarily be a coupling housing body, such as used for a quick-release coupling of the types disclosed in my Patent No. 2,916,306 and the Wallace Patent No. 2,835,309. The latter patent also shows a rolling-out tool that may be employed in the final joining step of my procedure. However, the member 15 may also be a coupling collar for one end of a pipe member, such as thread-secured at its outer, larger end to a threaded end of an adjacent pipe member.

What I claim is:

A method of securing a sleeve-like thin-wall tubular supported metal member of smooth-wall configuration within and about the inner peripheral wall of a thicker-wall tubular metal support member to provide a mechanical joint which comprises, forming serrations within and about the inner peripheral wall of the support member, assembling the tubular members by telescopically-inserting the tubular supported member in a slide-fitting telescopic relation within the tubular support member and fully over the serrations of its inner peripheral wall, and simultaneously radially-outwardly peening a pair of banding portions in a spaced relation axially of the tubular member assembly and rotatably about the inner peripheral wall of the supported member, while plastically expansion-deforming the pair of banding portions radially-outwardly in a complementary manner into radially-aligned serration bands of the inner peripheral wall of the support member that are in radial alignment with the pair of banding portions of the supported member, and while maintaining an intermediate banding wall portion of the supported member representing the spacing between the pair of banding portions, discontinuous with the pair of banding portions and in its smooth-wall form and substantially undeformed about and in engagement with ridges of a radially-aligned serration band of the support member.

References Cited by the Examiner

UNITED STATES PATENTS

| | | | |
|---|---|---|---|
| 1,998,047 | 4/35 | Farr | 29—523 |
| 2,153,863 | 4/39 | Fall | 80—5.1 |
| 2,156,169 | 4/39 | Unke | 138—96 |
| 2,429,076 | 10/47 | Sery | 285—382.4 |
| 2,701,584 | 2/55 | Philps | 138—96 |
| 2,898,971 | 4/59 | Hempel | 153—82 |
| 2,893,437 | 7/59 | Rickard | 138—96 |
| 3,113,377 | 12/63 | Oakes | 29—523 |

FOREIGN PATENTS 455,785    3/50    Italy.

CARL W. TOMLIN, *Primary Examiner.*